US009971578B2

(12) United States Patent
Duffy et al.

(10) Patent No.: US 9,971,578 B2
(45) Date of Patent: May 15, 2018

(54) REFERENCE ATTRIBUTE ANNOTATION SIGNIFYING NO EXTERNAL REFERENCE (71) Applicant: Microsoft Technology Licensing, LLC, Redmond, WA (US)

(72) Inventors: John J. Duffy, Seattle, WA (US); Jared P. Parsons, Kirkland, WA (US); Michael Sinz, Duvall, WA (US); Alexander D. Bromfield, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 820 days.

(21) Appl. No.: 13/652,436

(22) Filed: Oct. 15, 2012

(65) Prior Publication Data

US 2014/0108438 A1   Apr. 17, 2014

(51) Int. Cl.
*G06F 17/30* (2006.01)
*G06F 9/45* (2006.01)
(Continued)

(52) U.S. Cl.
CPC .............. *G06F 8/433* (2013.01); *G06F 9/468* (2013.01); *G06F 9/52* (2013.01); *G06F 17/30604* (2013.01); *G06F 17/30958* (2013.01)

(58) Field of Classification Search
CPC ............... G06F 17/30; G06F 17/30165; G06F 17/30171; G06F 12/1416; G06F 8/433;
(Continued)

(56) References Cited

U.S. PATENT DOCUMENTS 6,721,747 B2 *   4/2004   Lipkin .......................... 707/771
6,925,638 B1      8/2005   Koved et al.
(Continued)

FOREIGN PATENT DOCUMENTS

CN   101055518 A   10/2007
CN   101082866 A   12/2007
(Continued)

OTHER PUBLICATIONS

Colin S. Gordon, et, al., Uniqueness and Reference Immutability for Safe Parallelism, University of Washington, US 20 pages.
(Continued)

*Primary Examiner* — Vincent F Boccio
(74) *Attorney, Agent, or Firm* — Workman Nydegger (57) ABSTRACT The annotation of a returned reference from an executable component to signify that there are no external references to the particular object graph referenced by the returned reference. If either 1) there are no input arguments to the executable component or 2) each input argument is either immutable or represents an object graph that has no external mutable references pointing into the object graph, and no internal mutable references that reference external objects, the particular attribute is assigned to the returned reference. Accordingly, if the returned reference is writable (as determined by evaluating the declaration code or the call code for the executable component), the returned reference is free to have whatever access permissions assigned to it, and may also be assigned to an isolated memory location, though such assignments will cause the returned reference to lose the particular attribute.

20 Claims, 4 Drawing Sheets (51) Int. Cl.
G06F 9/46 (2006.01)
G06F 9/52 (2006.01)
(58) Field of Classification Search
CPC .............. G06F 17/30958; G06F 9/468; G06F 17/30604; G06F 9/52
USPC .......... 707/781, 694, 704, 792, 798
See application file for complete search history.

(56) References Cited

U.S. PATENT DOCUMENTS

| | | | |
|---|---|---|---|
| 2002/0107874 A1* | 8/2002 | DeLorme et al. ............ | 707/200 |
| 2003/0131348 A1 | 7/2003 | Hogstrom et al. | |
| 2009/0138850 A1 | 5/2009 | Yamaoka | |
| 2009/0198899 A1* | 8/2009 | Revanuru ..................... | 711/128 |
| 2010/0275191 A1* | 10/2010 | Duffy ...................... | G06F 9/526 |
| | | | 717/150 |

FOREIGN PATENT DOCUMENTS

| | | |
|---|---|---|
| CN | 10037338 | 3/2008 |
| CN | 101981545 | 2/2011 |

OTHER PUBLICATIONS

"First Office Action received in China Patent Application No. 201080017093.9", dated Nov. 4, 2013, Filed Date: Apr. 1, 2010, 14 Pages.

Bierhoff, et al., "Modular Typestate Checking of Aliased Objects", In Proceedings of the 22nd Annual ACM SIGPLAN Conference on Object-oriented Programming Systems and Applications, vol. 42, Issue 10, Oct. 25, 2007, pp. 301-320.

"Office Action Received in European Patent Application No. 10764898.2", dated Feb. 3, 2014, Filed Date: Apr. 1, 2010, 5 Pages.

"Office Action Issued in European Patent Application No. 13789915.9", dated Feb. 4, 2016, 4 Pages.

Office Action issued in Chinese Application #201380053879.X dated Feb. 23, 2017.

Japanese Office Action issued in JP Application No. 2015537021 dated Aug. 21, 2017.

* cited by examiner

REFERENCE ATTRIBUTE ANNOTATION SIGNIFYING NO EXTERNAL REFERENCE

BACKGROUND

Computing systems obtain a high degree of functionality by executing software programs. Programs consist of computer-executable instructions that are kept in some persistent form, such as on a harddrive, a compact disk, a thumbdrive, flash memory, or the like. During execution, such computer-executable instructions may often be loaded in volatile memory, and executed by one or more processors of the computing system, causing the computing system to perform tasks.

Computing systems that have multiple processors or multiple processor cores often partition the program into multiple concurrently executing tasks. Such concurrent execution can improve responsiveness and processing efficiency, but concurrent execution can result in different tasks trying to access the same data (known as "shared state") in the computing system.

However, unrestricted access to shared state can lead to problems that are hard to detect, reproduce and solve. Among these problems are data races. A data race is a situation where a task can observe an invalid state of an object in memory, while another task is at the same time mutating the state of that object. Exploiting the benefits of concurrency while avoiding data races has historically been a hard problem to solve.

BRIEF SUMMARY

At least one embodiment described herein relates to the annotation of a returned reference from an executable component. The returned reference references a particular object graph. If either 1) there are no input arguments to the executable component or 2) each input argument is either immutable or represents an object graph that has no external mutable references pointing into the object graph, and no internal mutable references that reference external objects, a particular attribute is assigned to the returned reference. The particular attribute signifies 1) that there are no external references to the particular object graph (or any object within the particular object graph) referenced by the returned reference, and 2) that there are no mutable references within the object graph to any objects outside of the object graph. Accordingly, the returned reference is free to have whatever access permissions assigned to it within the scope of the permission assigned to the returned reference. For instance, if the returned reference is declared as writable, the returned reference may be annotated with a particular attribute so as to represent that the returned reference may be assigned any permission and/or may be assigned to an isolated memory location, though such assignments will cause the returned reference to lose the particular attribute. Thus, the principles described herein allow for proper detection and annotation of references to which there are no external references.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the annotation of a returned reference from an executable component is described. The returned reference references a particular object graph. If either 1) there are no input arguments to the executable component or 2) each input argument is either immutable or represents an object graph that has no external mutable references pointing into the object graph, and no internal mutable references that reference external objects, a particular attribute is assigned to the returned reference. The particular attribute signifies 1) that there are no external references to the particular object graph (or any object within the particular object graph) referenced by the returned reference, and 2) that there are no mutable references within the object graph to any objects outside of the object graph. Accordingly, the returned reference is free to have whatever access permissions assigned to it within the scope of the permission assigned to the returned reference. For instance, if the returned reference is declared as writable, the returned reference may be annotated with a particular attribute so as to represent that the returned reference, and thus may be assigned any permission and/or may be assigned to an isolated memory location, though such assignments will cause the returned reference to lose the particular attribute. Thus, the principles described herein allow for proper detection of references to which there are no external references. Some introductory discussion of a computing system will be described with respect to FIG. 1. Then, the principles of operation of the annotation will be described with respect to FIGS. 2 through 4.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
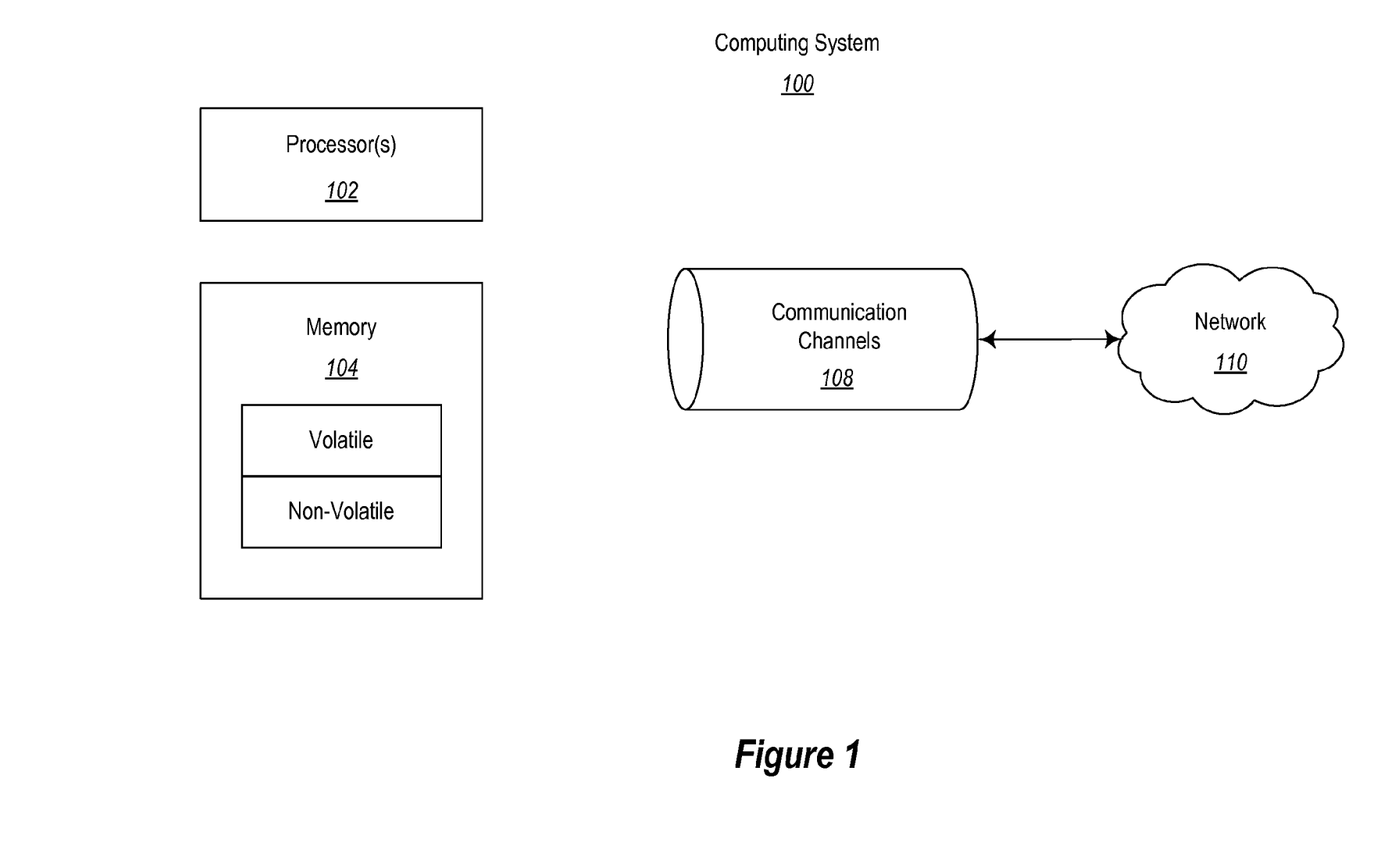
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
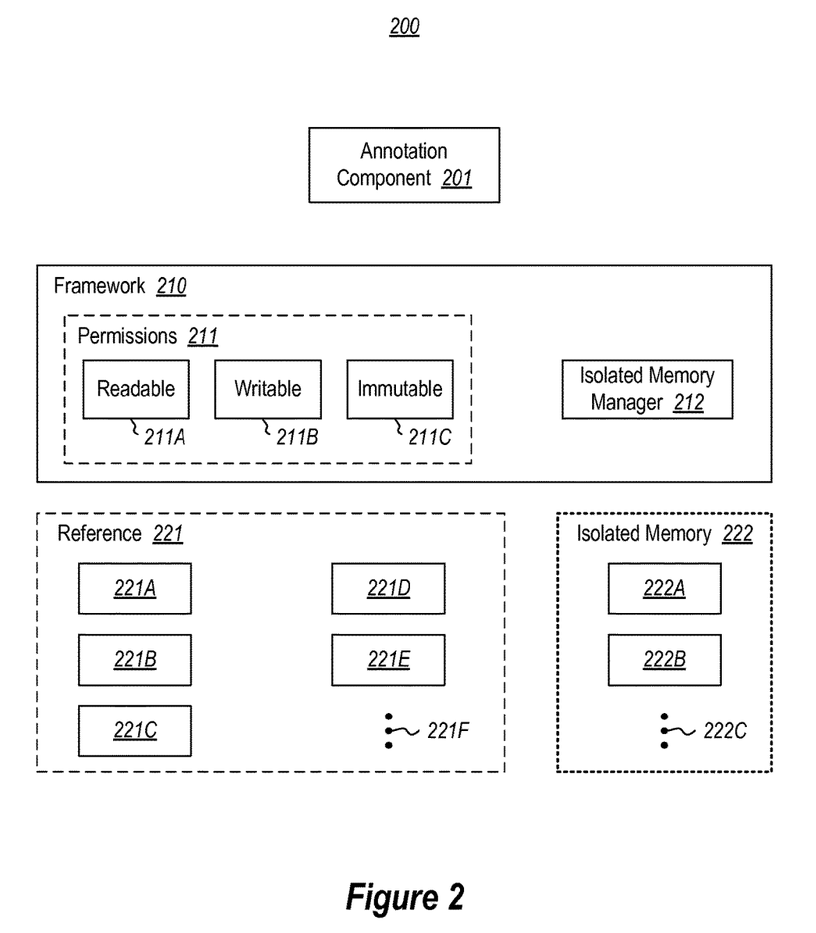
FIG. 2 illustrates an environment that includes a framework that tracks the isolation and mutability of object graphs, and an annotation component.

FIG. 2 illustrates an environment 200 in which the principles described herein may operate. The environment 200 includes framework 210 that tracks the isolation and mutability of object graphs. The framework 210 organizes various references 221 to object graphs by controlling access to the reference. A reference may be a local variable, a method parameter, an object field, or any other reference to an object graph. In the illustrated embodiment, references 221 are illustrated as including references 221A through 221E, although the ellipses 221F symbolically represent that the framework 210 may manage access to any number of references 220.

The framework 210 manages access to the references 221 by assigning permissions to the references. A "permission" is an annotation on a reference which indicates some property about whether the reference can be mutated. Such permissions are abstractly represented by permissions 211 in FIG. 2. The permissions include readable permissions 211A, writable permissions 211B and immutable permissions 211C. The "readable" permission 211A means that the corresponding object (and all of its fields, and all of its field's fields, and so forth) may only be read from. The "writable" permission 211B means that the corresponding object may be written to. The "immutable" permission 211C is like the readable permission 211A, but further guarantees that no one else has a writable reference to this object. The immutable permission 211C may further guarantee that there will never again be a writable reference to this object. Thus, an immutable permission 211C means that the corresponding object will never be written to, and similarly all of its fields, and all of its field's fields, and so forth, will never be written to. All static fields in an object are treated as having the immutable permission 211C by the framework 210.

The framework 210 also includes an isolated memory manager 212 which annotates memory locations as being isolated. The "isolated" annotation on a storage location means that the location stores a value which is externally unique. That is, for any object stored in that location, there are no external references to that object in the system, nor are there any references to any of the object's fields, or any fields of its fields, and so on. For instance, isolated memory manager 212 manages isolated memory locations 222. The isolated memory locations are illustrated as including two isolated memory locations 222A and 222B, though the ellipses 222C represents that the isolated memory locations 222 may include any number of isolated memory locations.

Figure 3:
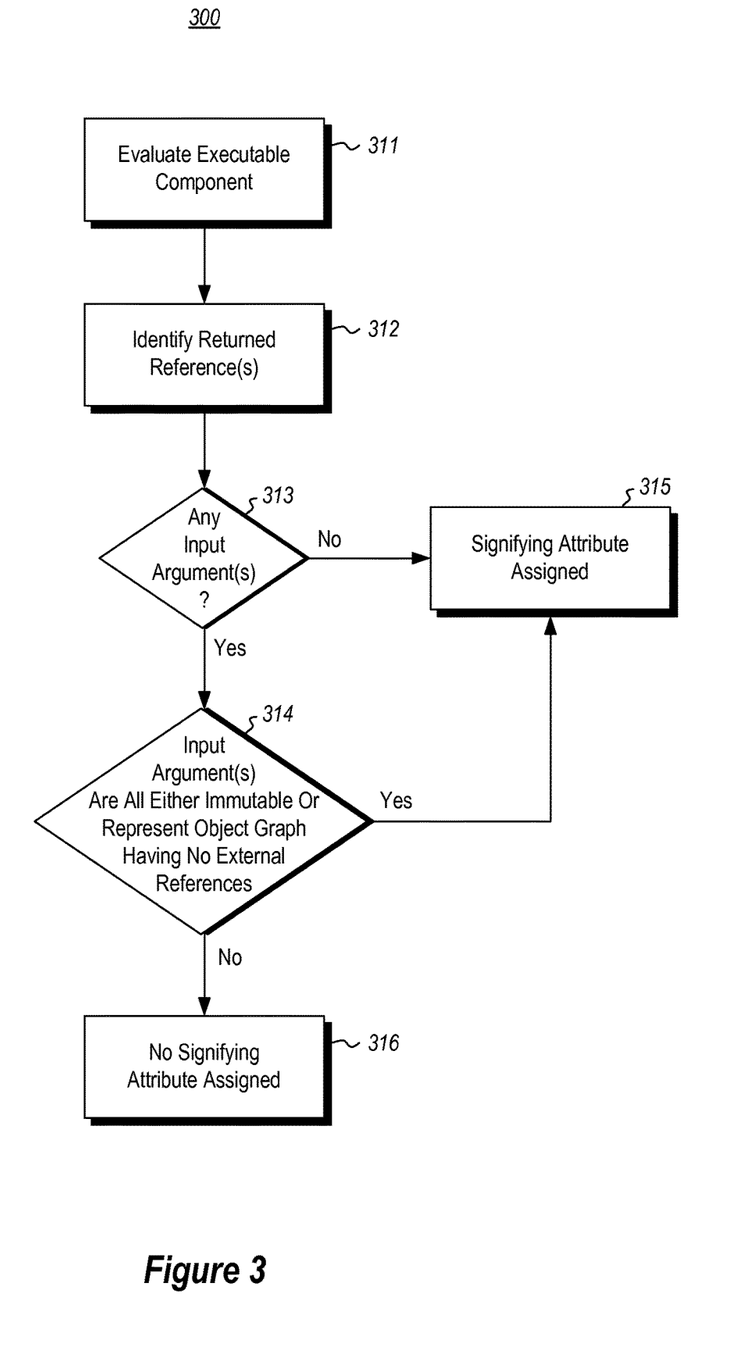
FIG. 3 illustrates a flowchart of a method for an annotation component, such as the annotation component of FIG. 2, to evaluate an executable component that returns at least a reference that references a particular object graph, and to annotate the reference returned by the executable component.

An annotation component 201 is built upon the framework 210 and operates as described further herein. Alternatively or in addition, the annotation component 201 may operate as part of the framework 210. The annotation component 201 is configured to evaluate an executable component that returns a reference, such as one of the references 221 of FIG. 2. FIG. 3 illustrates a flowchart of a method 300 for an annotation component to evaluate an executable component that returns at least a reference that references a particular object graph, and to annotate the reference returned by the executable component. As the method 300 of FIG. 3 may be performed by the annotation component 201 of FIG. 2, the method 300 will be described with frequent reference to both FIGS. 2 and 3.

The method 300 includes evaluating the executable component (act 311) to identify one or more returned references (act 312) that would occur as a result of executing the executable component. The remainder of the method 300 involves evaluating the returned references to determine if a particular attribute can be assigned the returned reference. In some cases, the remainder of the method may be performed by first evaluating the code where the executable component is declared. In other cases, the code where the execution component is called is evaluated where key characteristics of the returned references cannot be identified with the declaration code.

Figure 4:
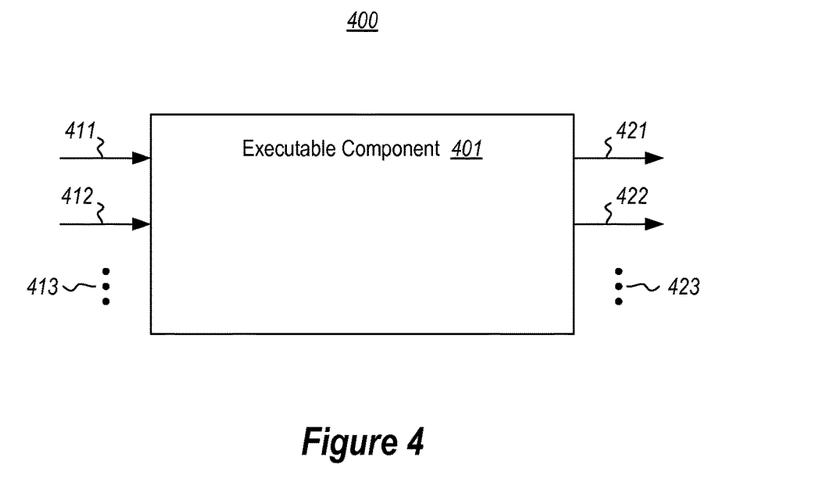
FIG. 4 illustrates an environment in which an executable component receives input arguments and generates returned references.

FIG. 4 illustrates an environment 400 in which an executable component 401 receives input arguments 411 and 412 and generates returned references 421 and 422. However, the ellipses 413 represents that there may be any number of input arguments (even zero, one or two or more) to the executable component 401. The ellipses 423 represents that there may be any positive number (one or more) of returned references resulting from execution of the executable component 401. The annotation component 201 may evaluate the code that declares or calls the executable component 401.

Regardless of whether the declaration code or call code related to the executable code is being evaluated, it is determined whether or not there are any input arguments to the executable component (decision block 313). If there are no any input arguments at all ("No" in decision block 313), then a signifying attribute may be assigned to the returned reference(s) (act 315). The signifying attribute signifies 1) that there are no external references to the particular object graph (or any object within the particular object graph) referenced by the returned reference, and 2) that there are no mutable references within the object graph to any objects outside of the object graph. In this description and in the claims, an attribute "signifies" a set of one or more claims, if the attribute is interpretable by the system as representing that the set of one or more claims are true.

For instance, consider the following code example:

```
public class MyClass
{
    int m_x;
    public MyClass( )
    {
        m_x = 0;
    }
}
```

The method MyClass is a constructor. In general, constructors return writable values. By evaluating this declaration (e.g., even prior to runtime), it can be observed that the expression "new MyClass( )" returns a value which is completely isolated from the outside world. There are no input arguments to the constructor ("No" in decision block 313). Therefore, any values stored in the newly-created object's fields come from one of two places: 1) they are newly-created inside the object's constructor, or 2) they originate from static fields. While the constructor is free to call methods and store the return values into fields, any method call's return value itself transitively comes from one of those two places.

The principles described herein works regardless of whether the framework 210 implements immutable or mutable statics. In the case of immutable statics, the framework 210 ensures that static fields are immutable. Accordingly, newly-created fields that come from the immutable static field may likewise have the guarantees signified by the signifying attribute. In other words, such newly generated fields 1) have no external references to the particular object graph (or any object within the particular object graph) referenced by the newly created field, and 2) that there are no mutable references within the object graph to any objects outside of the object graph.

In the case of the framework implementing mutable statics, the principles still apply if the executable component (either by the programmer or automatically by the compiler) is annotated using mutable statics. This may be modeled as a writable argument to the method, such that the method's output does not qualify for assigning the attribute.

For instance, the mental model is as follows:

```
void UsesMutableStatics(writable Statics s) {
    // The static variable is just an ordinary writable
    // reference. The compiler may plumb it through
    // for you, or a developer might do it through
    // a series of annotations (either opt-in or opt-out).
    s.Type.staticVariable = 42;
}
```

Thus, in act 315, the annotation component 201 assigns a special signifying attribute, which is used to model these newly-constructed, non-aliased values. The expression "new MyClass( )" is treated as having the signifying attribute. In some embodiments, this signifying attribute is a permission type having the value of "fresh". In that embodiment, since the constructor has no inputs, the permission of the return value (which is normally just "writable") is promoted from "writable" to "fresh". A fresh reference may be stored into a location with any permission—readable, writable, or immutable, although once done so, the fresh permission is lost. Furthermore, it may also be stored into an isolated location thereby losing its "fresh" permission. Note that locations are not to be marked as fresh. Thus, once a value has been stored in a location, it may be aliased, and so is no longer fresh. Thus, in this way, the signifying attribute (e.g., the fresh permission status) may be lost.

Returning to FIG. 3, if there are one or more input arguments to the executable component (Yes in decision block 313), it is determining whether the input argument is either immutable or represents an object graph that has no external mutable references pointing into the object graph, and no internal mutable references that reference external objects (decision block 314). If there are input arguments, and not all of them are immutable or otherwise satisfy these criteria ("No" in decision block 314), then the signifying attribute (e.g., the fresh permission) is not assigned (act 316).

However, if all of the input arguments to the executable component are either immutable or reference an object graph having no external mutable references pointing into the object graph, and no internal mutable references that reference external objects ("Yes" in decision block 314), then the signifying attribute (e.g., the fresh permission) may be assigned in this circumstance as well (act 315).

Consider the following code example in which a constructor takes in some input arguments that are immutable.

```
public class MyClass2
{
  int m__x;
  string m__y;
  immutable MyClass m__z;
  public MyClass2(int x, string y, immutable MyClass z)
  {
    m__x = x;
    m__y = y;
    m__z = z;
  }
}
```

In this case, the same analysis applies. Any newly-constructed instance of MyClass2 cannot share any mutable state with the outside world. Therefore, the newly constructed MyClass2 object may be assigned the signifying attributed (e.g., the fresh permission). This may be determined before runtime through analysis of the declaration of the MyClass2 constructor.

Now, consider the case where the constructor takes some arguments which are not always immutable:

```
public class MyClass3
{
  int m__x;
  string m__y;
  readable MyClass m__z;
  public MyClass3(int x, string y, readable MyClass z)
  {
    m__x = x;
    m__y = y;
    m__z = z;
  }
}
```

Recall that the readable permission indicates that this reference does not allow mutation, but another entity may still hold a writable reference, and thus mutation of the reference may be observed. Thus, although the first two input argument x and y are both immutable, the third input argument myClass is not immutable, but readable. Accordingly, it cannot be determined, based on analysis of the declaration alone, whether the attribute could be assigned to the returned myClass constructed by this constructor.

However, upon evaluating the runtime environment (i.e., the call code) of the actual execution of an instance of myClass, perhaps the third input argument might be elevated to immutable status since the immutable permission is just a certain type of the readable permission, with additional restrictions imposed. In the actual runtime environment, if those additional restrictions are observed, then the third input argument would be immutable. For instance, consider the following runtime code:

```
public void Run2(immutable MyClass myClass)
{
  immutable MyClass3 myClass3 = new MyClass3(5, "five", myClass);
}
```

In this case, it can be observed that the actual arguments of the new expression are all immutable. Therefore, in this particular instance, the returned reference can be assigned the signifying attribute (e.g., the fresh permission), even though the same constructor will often produce non-fresh values. In all of the above examples, the returned reference may be assigned the signifying attribute (e.g., the fresh permission) if the input argument also has the signifying attribute (e.g., the fresh permission). In some case, the annotating component 201 itself may have assigned the fresh permission to the input argument at a previous point in time.

So far, all of these examples have used constructors. In fact, the same analysis works for arbitrary executable components. Consider the following example. Note that the 'readable' annotation after Increment's parameter list means that the permission on 'this', and thus for all instance fields accesses or instance method calls, is readable.

```
public class Counter
{
  int m__x;
  public Counter( )
  {
    m__x = 0;
  }
  public writable Counter Increment( ) readable
  {
    writable Counter c2 = new Counter( );
    c2.m__x = m__x + 1;
    return c2;
  }
  public void Test( )
  {
    immutable Counter c =
    (new Counter( )).Increment( ).Increment( ).Increment( );
  }
}
```

The original call to "new Counter( )" returns a fresh object, as discussed above, since there are no input arguments to Counter( ). The first call to Increment( ) has one input, which is fresh, as it is the returned value from Counter( ). Therefore, since the permission of the return value of Increment( ) is "writable", the return value can safely be promoted to 'fresh'. The logic applies to each call in sequence. The "fresh" output of one becomes the "fresh" input of the next. The final call to Increment( ) returns a "fresh" value which can then be converted to "immutable".

The following expressions returns readable values:

```
public readable Counter Increment( ) readable
{
    writable Counter c2 = new Counter( );
    c2.m_x = m_x + 1;
    return c2;
}
```

In this case, while the same analysis applies, it is not safe to promote the return value to fresh. Doing so would allow it to be mutated. It is dangerous to convert a readable value to a writable value or an isolated value. However, the returned value may be assigned the readable or immutable permission. Since the immutable permission can always be reduced to readable, a method which returns a readable value could hypothetically be returning any field of an immutable object. In this case, promoting that return value to fresh would allow immutable data to be mutated, which is inconsistent. Instead, a different promotion rule is applied: the output is treated as having the "immutable" permission, rather than the "fresh" permission. This promotion is safe as before, if all the inputs are immutable or fresh, then it is not possible to share any mutable state with the outside world, and so the return value (which already cannot be mutated) may safely be treated as immutable.

Accordingly, the principles described herein allow returned references from executable objects to receive an attribute which signifies whether external references can access the object.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage devices having thereon computer-executable instructions that are structured such that, when executed by one or more processors of a computing system, cause the computing system to instantiate in memory an annotation component that is configured to evaluate an executable component that returns at least a reference that references a particular object graph, and to annotate the reference returned by the executable component, wherein the annotation component is configured to perform the following:

accessing an executable component that, when executed, generates and returns a reference that references the particular object graph;

determining whether there are any input arguments to the executable component;

when there are one or more input arguments to the executable component, for each input argument, determining whether the each input argument is either immutable or the each input argument represents an object graph that has no external mutable references pointing into the object graph and no internal mutable references that reference external objects; and when there are either no input arguments to the executable component or each input argument is either immutable or represents an object graph that has no external mutable references and no internal mutable references that reference external objects, assigning a signifying attribute having a value of fresh to the returned reference, wherein the fresh signifying attribute signifies:

1) that there are no external references to the particular object graph referenced by the return reference, and 2) that there are no mutable references within the object graph to any objects outside of the object graph.

2. The computer program product in accordance with claim 1, wherein the executable component has no input arguments.

3. The computer program product in accordance with claim 1, wherein the executable component has at least one input argument.

4. The computer program product in accordance with claim 3, wherein the annotation component determines that the input argument references an object graph that has no external mutable references by determining that the input argument also has the signifying attribute.

5. The computer program product in accordance with claim 4, wherein the signifying attribute of the input argument of the executable component was also assigned by the annotation component.

6. The computer program product in accordance with claim 3, wherein the annotation component determines that the input argument is immutable by evaluating an immutable permission of the input argument.

7. The computer program product in accordance with claim 3, wherein the annotation component determines that the input argument is immutable by evaluating an execution context of the executable component, which restricts the input argument to being immutable.

8. The computer program product in accordance with claim 1, wherein the executable component is declared as restricting the returned reference to being readable, but potentially also writable by other entities, wherein the signifying attribute is that the returned reference is immutable.

9. The computer program product in accordance with claim 1, wherein the executable component is not declared as restricting the returned reference to being readable.

10. The computer program product in accordance with claim 9, wherein the signifying attribute of the returned reference is removed if the returned reference is assigned an immutable permission.

11. The computer program product in accordance with claim 9, wherein the signifying attribute of the returned reference is removed if the returned reference is assigned a readable permission.

12. The computer program product in accordance with claim 9, wherein the signifying attribute of the returned reference is removed if the returned reference is assigned a writable permission.

13. The computer program product in accordance with claim 9, wherein the signifying attribute of the returned reference is removed if the returned reference is written to an isolated memory location.

14. The computer program product in accordance with claim 1, wherein the executable component is an object constructor.

15. A method for an annotation component of a computing system to evaluate an executable component that returns at least a reference that references a particular object graph, and to annotate the reference returned by the executable component, method comprising:

accessing code corresponding to an executable component that, when executed, generates and returns a reference that references the particular object graph;

evaluating the code corresponding to the executable component;

identifying a returned reference that would be returned by the executable component upon execution;

determining whether there are any input arguments to the executable component;

when there are one or more input arguments to the executable component, for each input argument, determining whether the each input argument is either immutable or the each input argument represents an object graph that has no external mutable references pointing into the object graph and no internal mutable references that reference external objects; and when there are either no input arguments to the executable component or each input argument is either immutable or represents an object graph that has no external mutable references and no internal mutable references that reference external objects, assigning a signifying attribute having a value of fresh to the returned reference, wherein the fresh signifying attribute signifies:

1) that there are no external references to the particular object graph referenced by the return reference, and 2) that there are no mutable references within the object graph to any objects outside of the object graph.

16. The method in accordance with claim 15, wherein the executable component is declared as restricting the returned reference to being readable, but potentially also writable by other entities, wherein the signifying attribute is that the returned reference is immutable.

17. The method in accordance with claim 15, wherein the signifying attribute of the returned reference is removed if the returned reference is assigned an access permission.

18. The method in accordance with claim 15, wherein the signifying attribute of the returned reference is removed if the returned reference is written to an isolated memory location.

19. The method in accordance with claim 18, wherein the executable component is not an object constructor.

20. A computer program product comprising one or more computer-readable hardware storage devices having thereon computer-executable instructions that are structured such that, when executed by one or more processors of a computing system, cause the computing system to instantiate in memory an annotation component that is configured evaluate an executable component that returns at least a reference that references a particular object graph, and to annotate the reference returned by the executable component, wherein the annotation component is configured to perform the following:

accessing an executable component that, when executed, generates and returns a reference that references the particular object graph;

determining whether there are any input arguments to the executable component;

when there are one or more input arguments to the executable component, for each input argument, determining whether the each input argument is either immutable or the each input argument represents an object graph that has no external mutable references pointing into the object graph and no internal mutable references that reference external objects; and when there are either no input arguments to the executable component or each input argument is either immutable or represents an object graph that has no external mutable references and no internal mutable references that reference external objects, assigning a signifying attribute having a value of fresh to the returned reference, wherein the fresh signifying attribute signifies:

1) that there are no external references to the particular object graph referenced by the return reference, and 2) that there are no mutable references within the object graph to any objects outside of the object graph; and wherein the signifying attribute of the returned reference is removed if the returned reference is assigned an immutable permission, a readable permission, a writable permission, or is written to an isolated memory location.

* * * * *